(12) United States Patent
Sata et al.

(10) Patent No.: US 8,125,597 B2
(45) Date of Patent: Feb. 28, 2012

(54) LIQUID CRYSTAL DISPLAY DEVICE

(75) Inventors: Hiroaki Sata, Minami-Ashigara (JP);
Kotaro Yasuda, Minami-Ashigara (JP);
Junichi Hirakata, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1024 days.

(21) Appl. No.: 12/073,160

(22) Filed: Feb. 29, 2008

(65) Prior Publication Data

US 2008/0212003 A1 Sep. 4, 2008

(30) Foreign Application Priority Data

Mar. 2, 2007 (JP) ................................ 2007-053010

(51) Int. Cl.
*G02F 1/1335* (2006.01)
(52) U.S. Cl. ......... 349/119; 349/117; 349/118; 349/141
(58) Field of Classification Search .................. None
See application file for complete search history.

(56) References Cited

U.S. PATENT DOCUMENTS 7,164,458 B2 * 1/2007 Itakura et al. ................. 349/119

(Continued)

FOREIGN PATENT DOCUMENTS

| JP | 09-080424 A | 3/1997 |
| JP | 11-305217 A | 11/1999 |
| JP | 2005-309386 A | 11/2005 |
| JP | 2006-30937 A | 2/2006 |
| JP | 2006-235576 A | 9/2006 |

(Continued)

OTHER PUBLICATIONS

Office Action from Chinese Patent Office issued in Applicant's corresponding Chinese Patent Application No. 200810082284.8 dated Aug. 2, 2010, with English translation.

*Primary Examiner* — Thanh-Nhan Nguyen
(74) *Attorney, Agent, or Firm* — Buchanan Ingersoll & Rooney PC

(57) ABSTRACT

A liquid crystal display device includes a pair of polarizing films; a liquid crystal cell that is sandwiched between the pair of polarizing films; a retardation layer (A) of 70 μm or less in thickness, which is disposed between the liquid crystal cell and one of the pair of polarizing films; and a retardation layer (B) of 70 μm or less in thickness, which is disposed between the liquid crystal cell and the other of the pair of polarizing films, wherein the retardation layers (A) and (B) satisfy following formulae (1) to (3):

RthU>RthD  Formula (1):

$-20 \text{ nm} \leq \text{RthD} \leq 20 \text{ nm}$  Formula (2):

$20 \text{ nm} < \text{RthU} \leq 60 \text{ nm}$  Formula (3):

wherein RthU and RthD represent a retardation in a thickness direction at a wavelength of 550 nm of the retardation layer (A) and the retardation layer (B), respectively.

7 Claims, 2 Drawing Sheets

U.S. PATENT DOCUMENTS

| | | |
|---|---|---|
| 2004/0001175 A1 | 1/2004 | Ito |
| 2005/0213012 A1 | 9/2005 | Yano et al. |
| 2007/0182895 A1* | 8/2007 | Fukagawa et al. ............ 349/117 |
| 2008/0204644 A1* | 8/2008 | Toyama et al. ............... 349/118 |

FOREIGN PATENT DOCUMENTS

| | | |
|---|---|---|
| JP | 2007-003917 A | 1/2007 |
| WO | WO 02/33454 A1 | 4/2002 |

* cited by examiner

OFF STATE          ON STATE

OFF STATE          ON STATE

LIQUID CRYSTAL DISPLAY DEVICE

BACKGROUND OF THE INVENTION

1. Field of the Invention

The present invention relates to a liquid crystal display device having a wide viewing angle property and exhibiting excellent color reproducibility over a wide viewing angle. Also, the present invention relates to improvements of color reproducibility and contrast viewing angle of a liquid crystal display device, particularly, an IPS-mode liquid crystal display device.

2. Description of the Related Art

Display devices using a liquid crystal display element (sometimes called a liquid crystal display panel), an electroluminescent element (classified into an organic system and an inorganic system by the fluorescent material used; hereinafter referred to as "EL element"), a field emission device (hereinafter referred to as "FED element"), an electrophoretic element or the like perform the image display without providing a space (vacuum casing) for two-dimensionally scanning electron beams, such as cathode ray tube (CRT), behind the display screen. Accordingly, these display devices are characterized by being thin and lightweight and less consuming the electric power. Such a display device is sometimes called a flat panel display from its characteristic feature in appearance.

Because of those advantages over the cathode ray tube, the display device using a liquid crystal display element, an EL element, a field emission element or the like is widely spreading in various uses such as OA equipment (e.g., notebook computer, monitor for personal computer), portable terminal and television, in place of the display device using a cathode ray tube. Behind the progress of shifting to the flat panel display from the cathode ray tube, there is a technical innovation such as enhancement of the pictorial quality, for example, enlargement of the viewing angle property or display color reproduction region of a liquid crystal display element, an EL element and the like. Also, with recent spread of the multimedia or Internet, the movie display performance is enhanced. Furthermore, expansion into the fields unrealizable by CRT, such as electron paper and large-screen information display for public use or advertisement, is proceeding.

The liquid crystal display device usually comprises a liquid crystal cell, a driving circuit for feeding a display signal voltage to the liquid crystal cell, a backlight (light source on the back side) and a signal control system for sending an input image signal to the driving circuit, and these are collectively called a liquid crystal module.

The liquid crystal cell usually comprises a liquid crystal molecule, two substrates for encapsulating and sandwiching the liquid crystal molecule, and an electrode layer for applying a voltage to the liquid crystal molecule, and a polarizing plate is further disposed outside of the liquid crystal cell. The polarizing plate usually comprises a protective film and a polarizing film and is obtained by dyeing a polarizing film comprising a polyvinyl alcohol film with iodine and after stretching the film, stacking a protective film on both surfaces thereof. In a transmissive liquid crystal display device, in some cases, this polarizing plate is fixed to both sides of the liquid crystal cell and one or more optically compensatory sheets are further disposed. Also, in a reflective liquid crystal display device, a reflector plate, a liquid crystal cell, one or more optically compensatory sheets, and a polarizing plate are usually disposed in this order. The liquid crystal cell performs the ON-OFF display by the difference in the orientation state of liquid crystal molecules and is applicable to any of the transmissive, reflective and transflective liquid crystal display devices.

When an optically compensatory sheet with the retardation values in the plane surface and in the thickness direction being controlled is used, a liquid crystal display device reduced in the change of brightness dependent on the viewing angle can be provided. For example, JP-A-11-305217 (the term "JP-A" as used herein means an "unexamined published Japanese patent application") proposes, for the purpose of preventing light leakage when viewed from an oblique direction, a wide viewing angle polarizing film having a polymer orientation film of which in-plane retardation and retardation in the thickness direction satisfy a predetermined relationship.

Also, JP-A-2006-30937 discloses a film where the retardation values in the plane surface and in the thickness direction of the protective film of the polarizing plate are controlled, and proposes a liquid crystal display device reduced in the light leakage when viewed from an oblique direction by combining the film with an optically compensatory sheet.

SUMMARY OF THE INVENTION

However, in those liquid crystal display devices, the brightness and the viewing angle of color can be hardly satisfied at the same time and in particular, the viewing angle at the black display time cannot be improved. Also, the durability of the panel is insufficient.

Accordingly, an object of the present invention is to provide a liquid crystal display device having excellent color reproducibility over a wide viewing angle.

Another object of the present invention is to provide a liquid crystal display device where color shift is unobserved or alleviated even when obliquely viewed at the black display time.

Still another object of the present invention is to provide a color filter contributing to the improvement of color reproducibility in a liquid crystal display device of horizontal orientation mode.

These objects can be attained specifically by the following means.

<1> A liquid crystal display device comprising:
a pair of polarizing films;
a liquid crystal cell that is sandwiched between the pair of polarizing films;
a retardation layer (A) of 70 μm or less in thickness, which is disposed between the liquid crystal cell and one of the pair of polarizing films; and
a retardation layer (B) of 70 μm or less in thickness, which is disposed between the liquid crystal cell and the other of the pair of polarizing films,
wherein
the liquid crystal cell comprises:
a pair of oppositely disposed substrates, at least one of which has an electrode; and
an orientation-controlled liquid crystal layer that is disposed between the pair of oppositely disposed substrates,
the electrode creates an electric field having a component parallel to the substrate having the electrode, and
the retardation layers (A) and (B) satisfy following formulae (1) to (3):

$$RthU > RthD \qquad \text{Formula (1):}$$

$$-20 \text{ nm} \leq RthD \leq 20 \text{ nm} \qquad \text{Formula (2):}$$

$$20 \text{ nm} < RthU \leq 60 \text{ nm} \qquad \text{Formula (3):}$$

wherein

RthU represents a retardation in a thickness direction at a wavelength of 550 nm of the retardation layer (A), and RthD represents a retardation in a thickness direction at a wavelength of 550 nm of the retardation layer (B).

<2> The liquid crystal display device as described in <1>, wherein the retardation layers (A) and (B) satisfy following formulae (4) and (5):

$$-10\ nm \leq ReU \leq 10\ nm \quad \text{Formula (4):}$$

$$-10\ nm \leq ReD \leq 10\ nm \quad \text{Formula (5):}$$

wherein

ReU represents an in-plane retardation at a wavelength of 550 nm of the retardation layer (A), and ReD represents an in-plane retardation at a wavelength of 550 nm of the retardation layer (B).

<3> The liquid crystal display device as described in <1>, wherein the retardation layers (A) and (B) both comprise a cellulose acylate film.

<4> The liquid crystal display device as described in <3>, further comprising:

two pairs of protective films, wherein each polarizing film of the pair of polarizing films is sandwiched between each pair of the two pairs of protective films, and the thinnest protective film and the thickest protective film are different in film thickness by 20 μm or less.

<5> The liquid crystal display device as described in <1>, wherein the electric field having a component parallel to the substrate having an electrode is generated by a pixel electrode and a counter electrode which are disposed in different layers.

<6> The liquid crystal display device as described in <1>, wherein the electric field having a component parallel to the substrate having an electrode is generated by a pair of electrodes, which are disposed in different layers and at least one of which is transparent, and by an electrode to which a voltage is not applied.

Figure 1:
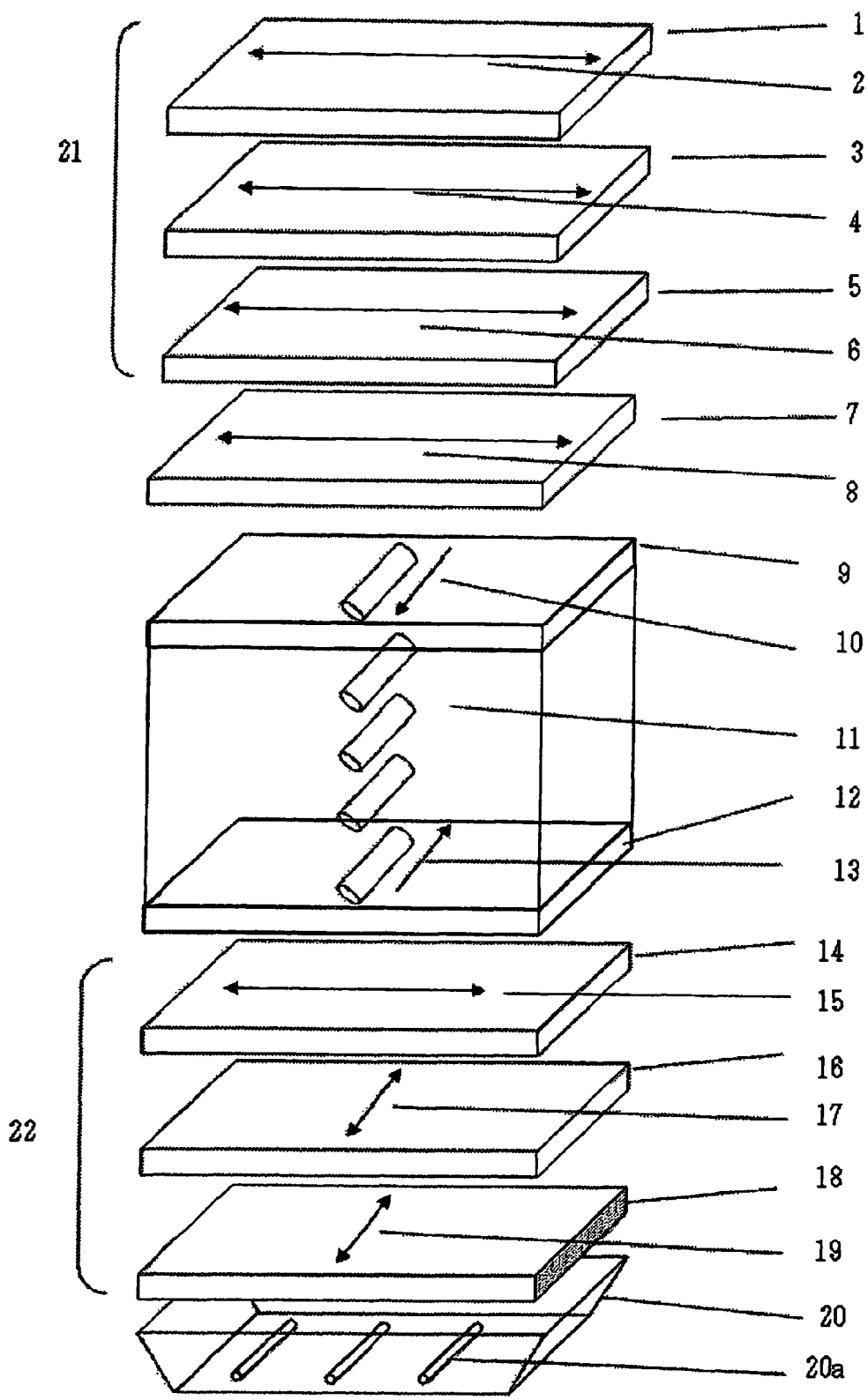
FIG. 1 illustrates a schematic view showing one example of the liquid crystal display device of the present invention.

1 denotes Upper polarizing plate protective film, 2 denotes MD Direction of upper polarizing plate protective film, 3 denotes Polarizing film of upper polarizing plate, 4 denotes Absorption axis of polarizing film of upper polarizing plate, 5 denotes Liquid crystal cell-side protective film of upper polarizing plate, 6 denotes MD Direction (slow axis direction) of liquid crystal cell-side protective film of upper polarizing plate, 7 denotes Optically anisotropic film, 8 denotes Slow axis of optically anisotropic film, 9 denotes Upper substrate of liquid crystal cell, 10 denotes Rubbing direction for liquid crystal orientation of upper substrate, 11 denotes Liquid crystal molecule (liquid crystal layer), 12 denotes Lower substrate of liquid crystal cell, 13 denotes Rubbing direction for liquid crystal orientation of lower substrate, 14 denotes Liquid crystal cell-side protective film of lower polarizing plate, 15 denotes MD Direction (slow axis direction) of liquid crystal cell-side protective film of lower polarizing plate, 16 denotes Polarizing film of lower polarizing plate, 17 denotes Absorption axis of polarizing film of lower polarizing plate, 18 denotes Lower polarizing plate protective film, 19 denotes MD Direction of lower polarizing plate protective film, 20 denotes Backlight unit, 20a denotes Light source lamp, 21 denotes Upper polarizing plate, 22 denotes Lower polarizing plate, 23 and 23' denote Direction of applied electric field, 24 denotes Linear electrode, 25 denotes Insulating layer, and 26 denotes Electrode.

DETAILED DESCRIPTION OF THE INVENTION

The embodiments of the present invention are described in detail below.

In the context of the present invention, the term "from (a numerical value) to (a numerical value)" is used to mean a range including the numerical values before and after "to" as a lower limit value and an upper limit value, respectively.

Also, in the context of the present invention, Re(λ) and Rth(λ) indicate the in-plane retardation and the retardation in the thickness direction, respectively, at a wavelength of λ.

[Optical Performance of Retardation Layer or Optical Film]

The Re(λ) of the retardation layer or optical film used in the present invention is a value measured using an ellipsometer (M-150, manufactured by JASCO Corp.) by applying light in the direction perpendicular to the film surface after moisture conditioning at 25° C. and 60% RH for 24 hours. The measurement wavelength range is from 400 to 700 nm.

As for the Rth(λ) of the retardation layer or optical film of the present invention, the retardation value Re(λ) is measured by making light at a wavelength of λ nm to be incident from directions inclined with respect to the film normal direction at 40° and −40° from the normal direction by using the in-plane slow axis as the inclination axis (rotation axis) (when the slow axis is not present, an arbitrary direction in the film plane is used as the rotation axis) and based on the values obtained, assumed values of the average refractive index and film thickness values input, Rth is calculated according to the following formulae (I) and (II).

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Formula (I)}$$

In the formula, Re(θ) represents the retardation value in the direction inclined at an angle of θ from the normal direction.

In formula (I), nx represents the refractive index in the in-plane slow axis direction, ny represents the refractive index in the direction crossing with nx at right angles in the plane, nz represents the refractive index in the direction crossing with nx and ny at right angles, and d represents the thickness of the film.

$$Rth = ((nx + ny)/2 - nz) \times d \quad \text{Formula (II)}$$

In the measurement above, as for the assumed value of average refractive index, the values described in *Polymer Handbook* (John Wiley & Sons, Inc.) and catalogues of various optical films can be used. The average refractive index of which value is unknown can be measured by an Abbe refractometer. The values of average refractive index of main optical films are as follows: cellulose acylate (1.48), cycloolefin polymer (1.52), polycarbonate (1.59), polymethyl methacrylate (1.49) and polystyrene (1.59).

The present invention relates to a liquid crystal display device comprising at least a pair of oppositely disposed substrates with at least one substrate having an electrode, a liquid crystal cell disposed between the substrates, which has an orientation-controlled liquid crystal layer and in which an electric field having a component parallel to the substrate having an electrode is created by the electrode, and a pair of polarizing films disposed to sandwich the liquid crystal cell, wherein a retardation layer (A) and a retardation (B) are further provided between the polarizing film and the liquid crystal cell and between the polarizing film of another polarizing plate and the liquid crystal cell, respectively, the retardation (RthU) in the thickness direction at a wavelength of 550 nm of the retardation layer (A) and the retardation (RthD) in the thickness direction at a wavelength of 550 nm of the retardation layer (B) satisfy all of the following formulae (1) to (3), and the thickness of the retardation layer (A) and the thickness of the retardation layer (B) both are 70 μm or less:

$$RthU > RthD \quad \text{Formula (1)}:$$

$$-20 \text{ nm} \leq RthD \leq 20 \text{ nm} \quad \text{Formula (2)}:$$

$$20 \text{ nm} < RthU \leq 60 \text{ nm}. \quad \text{Formula (3)}:$$

RthD is preferably $$-15 \text{ nm} \leq RthD \leq 15 \text{ nm}, \quad \text{Formula (2)}':$$

and more preferably $$-10 \text{ nm} \leq RthD \leq 10 \text{ nm}. \quad \text{Formula (2)}'':$$

Also, RthU is preferably $$20 \text{ nm} < RthU \leq 50 \text{ nm}, \quad \text{Formula (3)}':$$

and more preferably $$20 \text{ nm} < RthU \leq 45 \text{ nm}. \quad \text{Formula (3)}'':$$

The total in-plane retardation (ReU) at a wavelength of 550 nm of the retardation layer (A) and the total in-plane retardation (ReD) at a wavelength of 550 nm of the retardation layer (B) preferably satisfy the following formulae (4) and (5):

$$|ReU| \leq 10 \text{ nm} \quad \text{Formula (4)}:$$

$$|ReD| \leq 10 \text{ nm}. \quad \text{Formula (5)}:$$

ReU is preferably $$|ReU| \leq 8 \text{ nm}, \quad \text{Formula (4)}':$$

and more preferably $$|ReU| \leq 3 \text{ nm}. \quad \text{Formula (4)}'':$$

Also, ReD is preferably $$|ReD| \leq 8 \text{ nm}, \quad \text{Formula (5)}':$$

and more preferably $$|ReD| \leq 3 \text{ nm}. \quad \text{Formula (5)}'':$$

In the retardation layer (A), in view of reduction in the coloration of panel and in the color change due to viewing angle, it is preferred that $$|Re(450) - Re(630)| \leq 10 \text{ nm}, \quad (6)\text{-}3:$$

and $$|Rth(450) - Rth(630)| \leq 35 \text{ nm}. \quad (7)\text{-}4:$$

As described above, in the present invention, the thickness of each of the retardation layers (A) and (B) is 70 μm or less.

For reducing panel warpage which may occur due to environmental change, the thickness of each of the retardation layers (A) and (B) is preferably 60 μm or less, more preferably 50 μm or less.

The retardation layers (A) and (B) for use in the present invention are not particularly limited in the material therefor and each may be further divided into a plurality of layers. Above all, in the present invention, the retardation layers (A) and (B) both are preferably a polarizing film protective film. In this case, as long as the conditions specified above are satisfied, a retardation may be imparted to a self-adhesive material or an adhesive used for closely adhering the protective film and the substrate, or an optically compensatory film may be further disposed between the protective film and the substrate.

As regards the specific method for realizing the above-described retardation ranges in the retardation layers (A) and (B), there may be used a known technique such as a method using a polymer film obtained by copolymerizing a monomer having positive optical anisotropy and a monomer having negative optical anisotropy, and a method of adding an additive to a polymer film. Above all, a method of adding a retardation-decreasing agent to a polymer film described in JP-A-2006-30937 may be preferably used. The additive is not particularly limited in its molecular weight as long as it compatibilizes with the polymer film used and does not impair the transparency, and an additive having a molecular weight generally called an oligomer may also be used.

Other than these methods, the retardation in the above-described ranges of the retardation layers (A) and (B) can also be realized by adjusting the process conditions during the production of a polymer film, such as drying temperature conditions, conveying tension conditions and stretching treatment conditions, and these conditions may be adjusted within the range not impairing the film quality.

The wavelength dispersion of the retardation layers (A) and (B) for use in the present invention can be adjusted by an additive. The kind, amount added and addition method of the additive are not particularly limited, and the wavelength dispersion may be adjusted by a known method, such as a method of adding a material having absorption in the ultraviolet region.

The main component of the polymer film constituting the retardation layers (A) and (B) is preferably a polymer excellent in optical performance, transparency, mechanical strength, thermal stability, moisture blocking property, isotropy and the like. Examples thereof include a cellulose acylate, a polycarbonate-based polymer, a polyester-based polymer such as polyethylene terephthalate and polyethylene naphthalate, an acryl-based polymer such as polymethyl methacrylate, and a styrene-based polymer such as polystyrene and acrylonitrile●styrene copolymer (AS resin). Other examples include a polyolefin such as polyethylene and polypropylene, a polyolefin-based polymer such as ethylene●propylene copolymer, a norbornene-based polymer, a vinyl chloride-based polymer, an amide-based polymer such as nylon and aromatic polyamide, an imide-based polymer, a sulfone-based polymer, a polyethersulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer and a polymer obtained by mixing these polymers.

Among these, in view of adhesion to the polarizing film or processing suitability, a cellulose acylate is preferred, and cellulose acetate and cellulose acetate propionate are most preferred.

[Cellulose Acylate Film]

In addition to adjusting the retardation in the thickness direction, various functions may be imparted to the cellulose acylate film for use in the present invention, or for stably performing the production, various additives (for example, a plasticizer, an ultraviolet inhibitor, a deterioration inhibitor, a fine particle, a separation accelerator and an infrared absorbent) may be added thereto. Such an additive may be either a solid matter or an oily product. That is, the additive is not particularly limited in its melting point or boiling point. For example, mixing of ultraviolet absorbing materials having a melting point of 20° C. or less and a melting point of 20° C. or more, or similar mixing of plasticizers may be employed and these are described, for example, in JP-A-2001-151901. Examples of the separation accelerator include ethyl esters of citric acid.

In the case where the cellulose acylate film is formed as a multilayer film, the kind or amount added of the additive may differ among the layers. This is a conventionally well-known technique described, for example, in JP-A-2001-151902. Furthermore, the materials described in detail in *JIII Journal of Technical Disclosure*, No. 2001-1745, page 16 et seq., Japan Institute of Invention and Innovation (Mar. 15, 2001) are preferably used.

In the present invention, the cellulose acylate film is used in a thickness of 20 to 70 μm. The film thickness is generally adjusted by the flow rate during the production but when a film is formed by decreasing the flow rate under the same conditions except for the flow rate, |Rth(450)−Rth(630)| tends to become small and the retardation can be adjusted to the preferred embodiment of the present invention without using a method leading to rise in the cost, such as the above-described method of adding an additive for adjusting the wavelength dispersion.

On the other hand, if the film thickness is less than 20 μm, handling during film formation or processing into a polarizing plate becomes difficult and stable production can be hardly obtained. The film thickness is more preferably from 25 to 70 μm and most preferably from 30 to 50 μm.

[Production Method of Cellulose Acylate Film]

The film production method using a cellulose acylate solution is described below.

As regards the method and apparatus for producing the cellulose acylate film, a solution casting film-forming method and a solution casting film-forming apparatus conventionally used for the production of a cellulose triacetate film are used. The dope (cellulose acylate solution) prepared in a dissolving machine (kettle) is once stored in a storing kettle and finalized by removing bubbles contained in the dope. The dope is supplied to a pressure-type die from the dope discharge port through, for example, a pressure-type quantitative gear pump capable of feeding a constant amount of solution with high precision by the number of rotations and uniformly cast on an endlessly running metal support in the casting part from a mouth ring (slit) of the pressure-type die, and the damp-dry dope film (also called web) is peeled off from the metal support at the peeling point after traveling nearly one round of the metal support. The obtained web is nipped with clips at both ends and dried through conveyance by a tenter while keeping the width, and the obtained film is then mechanically conveyed by a roll group of a drying apparatus to complete the drying and taken up into a roll in a predetermined length by a take-up machine. The combination of the tenter and the drying apparatus comprising a roll group varies depending on the purpose. In addition to the solution casting film-forming apparatus, a coating apparatus may be added for applying a surface processing to the film, such as subbing layer, antistatic layer, antihalation layer and protective layer. These are described in detail in *JIII Journal of Technical Disclosure*, No. 2001-1745, pp. 25-30, Japan Institute of Invention and Innovation (Mar. 15, 2001), with categories of dissolution, casting (including co-casting), metal support, drying, separation and the like, and the contents therein can be preferably used in the present invention.

[Polarizing Plate]

The liquid crystal display device of the present invention comprises a pair of polarizing plates disposed to sandwich a liquid crystal layer. As regards the polarizing plate, for example, a polarizing plate obtained by dyeing a polyvinyl alcohol film or the like with iodine, stretching the film to produce a polarizing film, and stacking a protective film on both surfaces thereof may be used.

[Polarizing Film]

The polarizing film includes an iodine-based polarizing film, a dye-based polarizing film using a dichroic dye, and a polyene-based polarizing film. The iodine-based polarizing film and the dye-based polarizing film are generally produced using a polyvinyl alcohol-based film.

[Production Process of Polarizing Plate]

The production process of the polarizing plate for use in the present invention generally includes a drying step of shrinking the stretched film for polarizing film to reduce the volatile content, but after a protective film is laminated on at least one surface following or during the drying, a heating step is preferably provided. In the embodiment where the protective film serves also as a support of an optically compensatory film functioning as an optically compensatory layer, heating is preferably performed after laminating a protective film on one surface and a protective film having retardation on another surface. Specific examples of the method for laminating a protective film include a method of laminating a protective film to a polarizing film by using an adhesive during the film drying step while holding both ends, and then slitting both ends; and a method of, after drying, removing the film for polarizing film from the both-end holding parts, slitting both ends of the film, and laminating a protective film thereon. As for the slitting method, a general technique such as a method of cutting both ends with a cutter (e.g., knife) or a method using a laser, may be employed. After the films are laminated, the laminate is preferably heated so as to dry the adhesive and improve the polarizing performance. The heating conditions vary depending on the adhesive but in the case of an aqueous adhesive, the heating temperature is preferably 30° C. or more, more preferably from 40 to 100° C., still more preferably from 50 to 90° C. In view of performance and production efficiency, these steps are preferably performed in a consistent production line.

The adhesive for laminating the polarizing film and the protective films is not particularly limited, but examples thereof include a PVA-based resin (including a PVA modified with an acetoacetyl group, a sulfonic acid group, a carboxyl group, an oxyalkylene group or the like) and an aqueous boron compound solution. Above all, a PVA-based resin is preferred. The thickness of the adhesive layer is, in terms of dry thickness, preferably from 0.01 to 10 μm, more preferably from 0.05 to 5 μm.

[Optically Compensatory Film]

In the liquid crystal display device of the present invention, an optically compensatory sheet comprising a birefringent polymer film may be further used. The kind of the polymer is not particularly limited as long as the requirements of the present invention are satisfied. A birefringent polymer film satisfying the optical properties required of the optically compensatory film can be produced, for example, by appropriately using an additive or adjusting the stretching conditions.

[Liquid Crystal Material]

The liquid crystal material constituting the liquid crystal layer for use in the liquid crystal display device of the present invention is not particularly limited. For example, a nematic liquid crystal having a positive dielectric anisotropy $\Delta \in$ may be used as the liquid crystal material. The thickness (gap) of the liquid crystal layer is preferably set to be approximately from more than 2.8 µm to less than 4.5 µm. When the retardation ($\Delta n \bullet d$) of the liquid crystal layer is set to be from more than 0.25 µm to less than 0.32 µm, transmission properties almost free of wavelength dependency can be obtained in the visible light range. A maximum transmittance can be obtained when the liquid crystal molecules are turned at 45° from the rubbing direction to the electric field direction. Incidentally, the thickness (gap) of the liquid crystal layer is controlled by polymer beads. Of course, the same gap can be obtained by using glass beads or fibers or by using a resin-made columnar spacer. Also, the liquid crystal material LC is not particularly limited as long as it is a nematic liquid crystal. With a larger dielectric anisotropy $\Delta \epsilon$ value, the driving voltage can be decreased, and with a smaller refractive index anisotropy $\Delta n$, the thickness (gap) of the liquid crystal layer can be increased and reduction in the liquid crystal-encapsulating time as well as in the fluctuation of the gap can be attained.

[Liquid Crystal Cell]

The liquid crystal cell used for the liquid crystal display device of the present invention comprises a pair of oppositely disposed substrates with at least either one having an electrode and an orientation-controlled liquid crystal layer disposed between the substrates. An orientation film capable of orienting the liquid crystal molecules is preferably formed on both opposing inner surfaces of the substrates for the liquid crystal cell. Also, a color filter is preferably formed on either one of the opposing surfaces. A polarizing film or an optically anisotropic layer contributing to the optical compensation of retardation of the liquid crystal layer may be disposed inside of the liquid crystal cell. Also, a columnar or spherical spacer is generally disposed for keeping the distance (cell gap) between two substrates. Other than these, a reflector plate, a condenser lens, a brightness-enhancing film, a light-emitting layer, a fluorescent layer, a phosphorescent layer, an antireflection film, an antifouling film, a hardcoat film and the like may be disposed in the cell.

As regards the substrate for the liquid crystal cell, a transparent glass substrate is generally used, but a silicon glass substrate being harder and endurable against high temperatures may also be used. Furthermore, a plastic substrate with excellent heat resistance or a substrate composed of a polymer material may be also used. A flexible or reelable display using a substrate composed of a deformable material is also effective. In the reflection-type display device, it is sufficient if only one of the substrates is transparent, and a metal substrate such as stainless steel may be used for the other substrate.

In the present invention, the liquid crystal display device has at least three picture element regions. For example, in a liquid crystal display having a color filter and effecting color display, one pixel is generally formed by one set of light's three principal colors, that is, red, green and blue sub-pixels (picture element regions). In some cases, one pixel is formed by three or more color sub-pixels. One embodiment of the present invention is a multi-gap configuration where the sub-pixels of respective colors constituting one pixel are different in the cell gap.

Also, a structure called multi-domain where one pixel is divided into a plurality of regions may be employed so as to adjust the color balance or average the viewing angle characteristics.

Furthermore, a multi-gap configuration where three picture element regions vary in the thickness of the liquid crystal layer may be employed, or the electrode-to-electrode distance may be changed among three picture element regions.

[Color Filter]

In the liquid crystal display device of the present invention, a color filter is preferably disposed on one opposing surface of a pair of substrates for the liquid crystal cell. The color filter is not particularly limited, but, for example, a color filter comprising respective layers of red (R), green (G) and blue (B) is preferably disposed.

In the liquid crystal display device of the present invention, the liquid crystal cell has three picture element regions as described above, and color filters disposed respectively on at least two picture element regions out of those regions are different in the Rth from each other. It is preferred that the color filters disposed respectively on three picture element regions are different in the Rth from each other. One preferred means for achieving this configuration is a method where out of the color filters disposed respectively on those three picture element regions, the color filters disposed on at least two picture element regions are made to be different in the thickness.

By virtue of this method, out of the Rth values of color filters disposed respectively on those three picture element regions, the Rth values of color filters disposed respectively on at least two picture element regions can be made different, and the object of the present invention can be more effectively achieved.

The color filter can be produced, for example, by the following method. First, colored pixels according to the purpose, such as red, green and blue, are formed on a transparent substrate. As for the method of forming colored pixels such as red, green and blue on a transparent substrate, there may be appropriately used, for example, a dyeing method, a printing method, a colored resist method of coating a colored photosensitive resin solution by a spin coater or the like and then patterning the coating through photolithography, or a lamination method. For example, in the formation method including a coating step, a color filter having RGB layers different in the thickness can be formed by adjusting the amount coated. In the case of utilizing a lamination method, a color filter comprising RGB layers different in the thickness can be formed by using transfer materials differing in the thickness.

In the case of forming a black matrix by using a black photosensitive resin, the black matrix is preferably formed after the above-described colored pixels were formed. Because, if the black matrix is formed first, curing proceeds only in the resin surface in the case of a black photosensitive resin having a high optical density and the uncured resin dissolves out (referred to as side etching) in the subsequent development, particularly, development performed repeatedly for forming colored pixels, giving rise to separation of the formed matrix in an extreme case.

On the contrary, when the black matrix is formed in the last place, the periphery of the black matrix is surrounded by colored pixels and less allows penetration of a developer from the cross-section and this is greatly advantageous in that side etching hardly occurs and a black matrix having a high optical density can be formed.

Furthermore, in the case where colored layers for the formation of colored pixels are formed by a lamination method, if a black matrix is formed first, the places where colored pixels should be formed are closed nearly in a lattice manner by the black matrix and there arises a problem that a bubble is readily entrained at the lamination, but when the black matrix is formed later, such a problem is not caused and this is preferred.

In the case where the light transmittance of the colored pixel exceeds 2% in the photosensitive wavelength region of the black photosensitive resin, a light absorbent or the like is preferably added previously in the colored pixel to reduce the transmittance to 2% or less. As for the light absorbent used here, various known compounds may be used. Examples thereof include a benzophenone derivative (e.g., Michler's ketone), a merocyanine-based compound, a metal oxide, a benzotriazole-based compound and a coumarin-based compound. Among these, compounds having good light absorptivity and capable of keeping a light-absorbing performance of 25% or more even after heat treatment at 200° C. or more are preferred. Specific examples thereof include titanium oxide, zinc oxide, a benzotriazole-based compound and a coumarin-based compound, with a coumarin-based compound being preferred from both aspects of heat resistance and light absorptivity. Incidentally, the above-described heat treatment at 200° C. or more is performed for further curing each pixel formed.

Next, a black photosensitive resin layer is provided over the entire surface of the transparent substrate to cover the pixel pattern and this may be performed using, for example, a method of coating a black photosensitive resin solution by a spin coater or a roll coater, or a method of previously coating a black photosensitive resin solution on a temporary support to form an image forming material and then transferring the black photosensitive resin layer onto the pixel pattern.

Subsequently, the stack is exposed through a photomask from the black photo-sensitive resin layer side to cure the black photosensitive resin layer in the light-shielded part where a colored pixel is not present (black matrix). The colored pixels are usually not disposed at designed intervals or in a size as arranged, because slight displacement is caused by an alignment error of the exposure apparatus or by the effect of thermal expansion of the substrate, or the pixel itself is thickened or thinned. This tendency is emphasized particularly on a large-size substrate. For this reason, exposure through a photomask having pixel intervals as designed brings about generation of a portion where the black matrix is overlapped with the pixel or a portion where conversely a gap is formed between the black matrix and the pixel. The overlapped portion appears as a projection, and the gapped portion causes light leakage. These portions both are undesirable.

In the case of producing the color filter by using a transfer material, the retardation of the color filter may be adjusted by adding a retardation raising agent or a retardation decreasing agent to a photosensitive layer or a colored layer which are a constituent layer of the transfer material.

Representative examples of the retardation raising agent which can be used include additives described in JP-A-2000-111914. As regards the retardation decreasing agent, additives and the like described, for example, in JP-A-2006-30937 may be preferably used.

The embodiment of the present invention is described below by referring to the drawings.

The liquid crystal display device shown in FIG. 1 comprises a liquid crystal cell (9 to 13); an upper polarizing plate 21 (1 to 6) and a lower polarizing plate 22 (14 to 19), which are disposed to sandwich the liquid crystal cell; and a backlight unit 20 comprising a lamp 20a as a light source, which is disposed further on the outer side of the lower polarizing plate 22. The liquid crystal cell (9 to 13) comprises a liquid crystal cell upper substrate 9, a liquid crystal cell lower substrate 12, and a liquid crystal layer 11 sandwiched therebetween. The lower substrate 12 has, on the opposing surface thereof, an electrode layer (not shown in FIG. 1), and the electrode layer is constructed to be able to provide the liquid crystal layer with an electric field parallel to the surface of the substrate 12. The electrode layer is usually composed of transparent indium tin oxide (ITO). On the electrode layer of the substrate 12 and on the opposing surface of the substrate 9, an orientation layer (not shown in FIG. 1) for controlling the orientation of liquid crystalline molecules 11 is formed and when a drive voltage is not applied, the direction of orientation of the liquid crystalline molecules 11 is controlled by the direction 10 or 13 of rubbing applied to the surface of the orientation layer.

The shape, construction and the like of the electrode are not particularly limited and may be any shape or construction as long as an electric field parallel to the substrate of the liquid crystal cell can be created. In general, an electrode construction employed in IPS-mode and FFS-mode liquid crystal display devices can be utilized. For example, the electrode may be composed of a pixel electrode and a counter electrode disposed in different layers or may be composed of a pair of electrodes disposed in different layers with at least one electrode being transparent, and an electrode to which a voltage is not applied.

Figure 2:
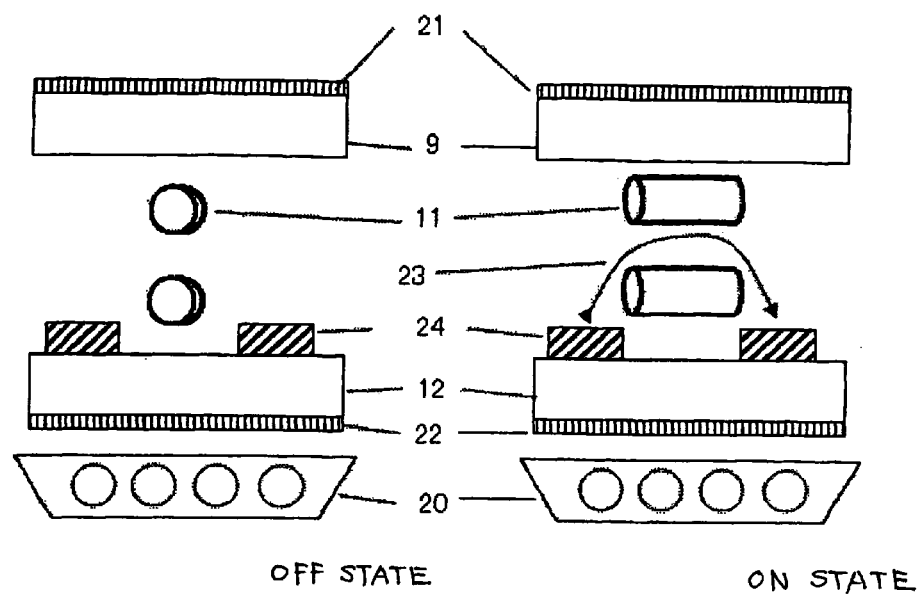
FIG. 2 illustrates a schematic cross-sectional view showing one example of the liquid crystal display device of the present invention.

FIG. 2 schematically shows the OFF state and the ON state according to one example of an IPS-mode liquid crystal display device. Incidentally, FIG. 2 shows only a part of one pixel of the liquid crystal display device, and the relative size and the like of each member are not necessarily agreeing with those actually employed. The same applies to FIG. 3 described later. Also, in FIG. 2, the same reference numerals are used for the members corresponded to the members in FIG. 1, and the same applies to FIG. 3 described later.

In FIG. 2, a plurality of linear electrode layers 24 formed on the opposing surface of the substrate 12 create, when a voltage is applied, an electric field 23 containing an electric field component parallel to the plane of the substrate 12. In the state of a voltage being not applied or a low voltage being applied (OFF state), the orientation of the liquid crystalline molecules 11 is controlled by the rubbing axis (10 or 13 in FIG. 1) on the opposing surface of the substrate 9 or 12 to make a slight angle with respect to the longitudinal direction of the linear electrode layers 24. Here, the liquid crystal is assumed to have positive dielectric anisotropy. In the state of a voltage being applied to linear electrode layers 24 (ON state), an electric field 23 containing a component parallel to the substrate 9 or 12 is created, and the liquid crystalline molecules 11 are orientation-controlled while allowing their long axes to agree with the electric field direction. Incidentally, the electric field 23 direction preferably makes an angle of 20° C. or less, more preferably 10° C. or less, with respect to the surface of the substrate 12, that is, runs substantially in parallel. In the following, electric fields at an angle of 20° C. or less are collectively called a parallel electric field. Also, the same effect is obtained either when the linear electrode layers 24 are formed in parts on the upper and lower substrates or when formed only on one substrate.

Figure 3:
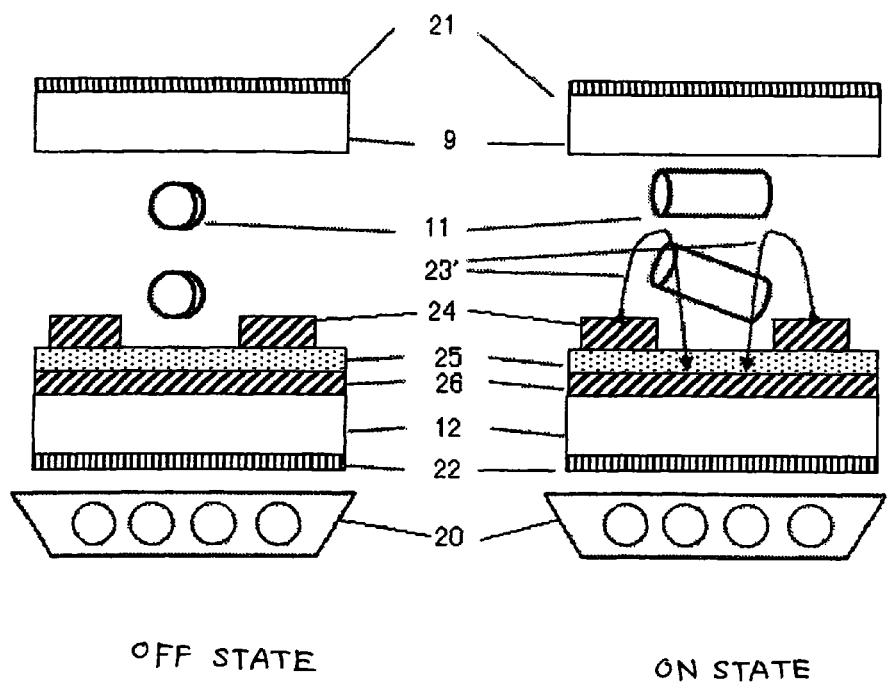
FIG. 3 illustrates a schematic cross-sectional view showing one example of the liquid crystal display device of the present invention.

FIG. 3 schematically shows the OFF state and the ON state according to one example of an FFS-mode liquid crystal display device. The same reference numerals are used for the same members as in FIG. 2 and their detailed description is omitted.

In FIG. 3, the electrode has a two-layer structure composed of an upper electrode layer 24 and a lower electrode layer 26, and these electrode layers are disposed as different layers through an insulating layer 25. The electrode layer 26 may be an unpatterned electrode layer or a linearly patterned electrode layer. The upper electrode layer 24 is preferably linear but may have any pattern shape such as mesh, spiral or dot as long as the shape allows passing of an electric field coming from the lower electrode layer 26. A floating electrode having a neutral potential may be further added. The insulating layer 25 may be a layer composed of an inorganic material such as SiO or nitride film or may be a layer composed of an organic material such as acrylic or epoxy-based material. A voltage is applied to the upper electrode layer 24 and the lower electrode layer 26, whereby an electric field 23' containing a component parallel to the substrate 9 is created. In the OFF state, similarly to the IPS mode, the liquid crystalline molecules 11 are oriented while allowing their long axes to agree with the rubbing axis (10 or 13 in FIG. 1) on the opposing surface of the substrate 9 or 12. On the other hand, in the ON state, an electric field 23' containing a component parallel with the substrates 9 and 12 is created and the liquid crystalline molecules 11 are oriented while allowing their long axes to agree with the electric field direction.

Although a detailed structure is not shown in FIG. 1, an RGB color filter is disposed on the opposing surface of the upper substrate 9 or the lower substrate 12 of the liquid crystal cell, and the liquid crystal cell has three picture element regions where an R layer, a G layer and a B layer are formed. In this embodiment, out of these three colored layers, at least two colored layers, for example, G layer and R layer, or G layer and B layer, are preferably different in the value of Rth in the thickness direction from each other. It is more preferred that three colored layers are different in Rth from each other. In the RGB color filter, the main wavelength at which the picture element region takes the maximum transmittance is, in the ascending order, blue light wavelength $\lambda_B$, green light wavelength $\lambda_G$ and red light wavelength $\lambda_R$. In this embodiment, assuming that the retardation values in the thickness direction of R, G and B layers are Rth($\lambda_B$), Rth($\lambda_G$) and Rth($\lambda_R$), the Rth($\lambda_B$) of the RGB color filter preferably satisfies the following relational formula (9). Furthermore, preferably at least one, more preferably both, of Rth($\lambda_G$) and Rth($\lambda_R$) of the RGB color filter satisfy the following formulae (10) and (11).

Rth($\lambda_B$)≦5 nm (9):

−35 nm≦Rth($\lambda_G$)≦25 nm (10):

−45 nm≦Rth($\lambda_R$)≦0 nm (11):

In order to satisfy these relational formulae, a color filter where, for example, the thickness ($d_r$) of R layer, the thickness ($d_g$) of G layer and the thickness ($d_b$) of B layer are different from each other may be used.

Again, in FIG. 1, the liquid crystal cell is disposed between the upper polarizing plate 21 and the lower polarizing plate 22, and the upper polarizing plate 21 and the lower polarizing plate 22 are disposed by crossing the absorption axes 4 and 17 with each other. In the case where the upper polarizing plate 21 is the viewing-side polarizing plate, the upper polarizing plate 21 is preferably stacked such that the absorption axis 4 crosses with the direction of abnormal light refractive index of the liquid crystalline molecules 11 in the liquid crystal cell at the voltage non-applied time (OFF state). The upper polarizing plate 21 comprises a polarizing film 3 and protective films 1 and 5 disposed on the surfaces thereof, and the lower polarizing plate 22 comprises a polarizing film 16 and protective films 14 and 18 disposed on the surfaces thereof.

In FIG. 1, a case of making light to be incident from the backlight unit 20 disposed on the outer side of the lower polarizing plate 22 is described below. In the non-driving state (OFF state) where a drive voltage is not applied to the electrode (not shown in FIG. 1), the liquid crystalline molecules 11 in the liquid crystal layer are oriented nearly in parallel to the surfaces of the substrates 9 and 12 and at the same time, the long axes thereof are oriented nearly in parallel to the rubbing axes 10 and 13. In this state, the light converted into a predetermined polarization state by the polarizing film 16 is not affected by birefringence of the liquid crystalline molecules 11 and is consequently blocked by the absorption axis 4 of the polarizing film 3. At this time, black display appears. On the other hand, in the driving state (ON state) where a drive voltage is applied to the electrode (not shown in FIG. 1), an electric field containing a component parallel to the substrates is formed, and the liquid crystalline molecules 11 are oriented while allowing their long axes to agree with the electric field direction. As a result, the light converted into a predetermined polarization state by the polarizing film 18 is subject to change in the polarization state by the effect of birefringence of the liquid crystalline molecules 11 and consequently passes through the polarizing film 3. At this time, white display appears. In the present invention, the retardation Rth in the thickness of the color filter is varied among the picture element regions, so that good color reproducibility can be obtained over a wide range of viewing angle and coloration at the black display time, so-called color shifting, can be reduced.

In the IPS-mode liquid crystal display device shown in FIG. 2, the liquid crystal layer is preferably disposed by arranging its orientation control direction (rubbing axes 10 and 13 in FIG. 1) to run in the vertical direction, that is, the twelve-six direction, of the display device, and the absorption axes 4 and 17 of the upper polarizing plate and lower polarizing plate are also preferably disposed in the twelve-six direction and crossed. Furthermore, the slow axis 6 and 15 of the protective films 5 and 14 disposed between the polarizing film 3 or 16 and the liquid crystal layer are also preferably disposed in the twelve-six direction and disposed in parallel with the rubbing axis of the liquid crystal cell substrate disposed closer thereto. This arrangement is effective for reducing leakage light at the black display time or eliminating coloration in the viewing angle direction.

As shown in FIG. 1, an optically anisotropic layer 7 may be disposed between the liquid crystal cell-side protective film 5 of the upper polarizing plate 21 and the liquid crystal layer 11. The retardation value of the optically anisotropic layer 7 is preferably set to be not more than twice the Δn●d value of the liquid crystal layer 11. In the configuration shown in FIG. 1, the optically anisotropic layer 7 is disposed between the protective film 5 of the upper polarizing plate 21 and the liquid crystal layer 11 but may be disposed between the protective film 14 of the lower polarizing plate 22 and the liquid crystal layer 11 or may be disposed in both. Also, as for the retardation of the protective film 5 of the upper polarizing film 3, when Rth is 20 nm or more larger than the retardation of the protective film 14 of the lower polarizing film 16, this is effective for reducing leakage light at the black display time or eliminating coloration in the viewing angle direction.

In the FFS-mode liquid crystal display device shown in FIG. 3, the liquid crystal layer is preferably disposed by arranging its orientation control direction (rubbing axes 10 and 13 in FIG. 1) to run in the transverse direction, that is, the third-ninth direction, of the display device, and the absorption axes 4 and 17 of the upper polarizing plate and the lower polarizing plate are also preferably disposed in the third-ninth direction and crossed. Furthermore, the slow axes 6 and 11 of the protective films 5 and 14 disposed between the polarizing film 3 or 16 and the liquid crystal layer are also preferably disposed in the third-ninth direction and disposed in parallel with the rubbing axis of the liquid crystal cell substrate disposed closer thereto. This arrangement is effective for reducing leakage light at the black display time or eliminating coloration in the viewing angle direction. Also, as shown in FIG. 1, an optically anisotropic layer 7 may be disposed between the liquid crystal cell-side protective film 5 of the upper polarizing plate 21 and the liquid crystal layer 11. The retardation value of the optically anisotropic layer 7 is preferably set to be not more than twice the $\Delta n \cdot d$ value of the liquid crystal layer 11. In the configuration shown in FIG. 1, the optically anisotropic layer 7 is disposed between the protective film 5 of the upper polarizing plate 21 and the liquid crystal layer 11 but may be disposed between the protective film 14 of the lower polarizing plate 22 and the liquid crystal layer 11 or may be disposed in both.

The shape and arrangement of the electrode are not limited to those in the configurations shown in FIGS. 2 and 3, and any shape or construction of the electrode employed in conventional IPS-mode and FFS-mode devices can be utilized. For example, in order to obtain a wider viewing angle, linear electrodes (sometimes referred to as a "comb electrode") may be arranged in a zigzag pattern. In this case, however, orientation of liquid crystalline molecules in the liquid crystal layer may be disturbed at a curved part of the electrode to reduce the contrast of the display device. For alleviating this reduction in the contrast, it is effective to arrange the slow axes (6 and 15 in FIG. 1) of the protective films (5 and 14 in FIG. 1) comprising cellulose acylate film or the like disposed on the polarizing films (3 and 16 in FIG. 1) to cross with the average orientation control directions (10 and 13 in FIG. 1) of the liquid crystal layer 11 within 10°. When such an arrangement is employed, the retardation unevenness of the liquid crystal layer due to the disturbed orientation can be compensated and the uniformity of display can be enhanced. Furthermore, as for the brightness unevenness at the black display time due to disturbed orientation of the liquid crystal molecules resulting from rubbing, the protective film is disposed by arranging its slow axis to cross with the rubbing axis, whereby the retardation unevenness can be self-compensated and the brightness unevenness can be reduced.

The average direction of disturbed orientation of the liquid crystal molecules is slipped by approximately from 5 to 15° from the original orientation control direction. The display unevenness can be reduced by crossing the slow axis of the protective film with the average orientation axis to compensate the retardation. In the case of disposing the protective film by crossing its slow axis, as described above, if the Re value of the protective film is large, even when the unevenness can be reduced, the absolute value of black brightness may be increased and contrast drop may result. Therefore, a protective film having a small Re of nearly 0, such as cellulose acylate film described in JP-A-2005-138375, is preferably used.

Furthermore, as described above, the unevenness can be similarly reduced by disposing an optically anisotropic layer and crossing its slow axis, orientation control direction or average orientation direction with the average orientation control direction of the liquid crystal layer within 10°.

The FFS mode has a tendency of the viewing angle becoming narrower as compared with the IPS mode and also, is characterized in that the liquid crystal orientation is greatly disturbed at the electrode end because of a high electric field applied thereto. For these reasons, when the slow axes (6 and 15 in FIG. 1) of the protective films (5 and 14 in FIG. 1) comprising a cellulose acylate film or the like are crossed with the average orientation control directions (10 and 13 in FIG. 1) of the liquid crystal layer 11 within 10°, a higher effect of reducing the unevenness is obtained.

Incidentally, in a liquid crystal display device in either mode of IPS mode and FFS mode, with respect to both or either one of the polarizing plates on the viewing side and the backlight side, the absorption axis of the polarizing film is preferably slipped in the above-described range from the slow axis of the protective film, and it is more preferred that the absorption axis of the polarizing film in only one polarizing plate is slipped in the above-described range from the slow axis of the protective film.

[Backlight]

The liquid crystal display device effects the display by the ON or OFF-cutting of light passing through the liquid crystal cell and in use as a transmissive liquid crystal display device, a backlight using a cold-cathode or hot-cathode fluorescent tube, light-emitting diode, field emission element or electroluminescent element as the light source can be disposed on the back side, and this gives a bright and clear display device.

The backlight includes a side edge-type backlight used for portable terminals and notebook computers and a directly beneath-type backlight used for display devices such as television. The side edge type has one or two fluorescent lamps at the end part of a light guide plate and is advantageous in that the thickness of the backlight unit can be made small. On the other hand, in the directly beneath type, the number of fluorescent lamps can be increased according the required brightness and high brightness can be easily obtained. A structure where in the side edge-type or directly beneath-type backlight, a light-emitting diode, a field emission element, an electro-luminescent element or the like is used in place of the fluorescent lamp, or a combination of these plural light sources, is also effective.

In order to more enhance the emission efficiency of the backlight, a prism-like or lens-like condenser-type brightness enhancing sheet (film) may be stacked, or a polarizing reflection-type brightness enhancing sheet (film) for improving light loss due to absorption by the polarizing plate may be stacked between the backlight and the liquid crystal cell. Also, a diffusion sheet (film) for equalizing the light from the backlight light source may be stacked or on the contrary, a sheet (film) having formed by printing thereon a reflection or diffusion pattern for imparting in-plane distribution to the light from the light source may be stacked. The backlight includes, in addition to the backlight which is always lighted, a backlight which is intermittently lighted, and a backlight which is divided into a plurality of regions to emit light. Also, the light can be adjusted by correlating the light emitting method to a picture image. A structure where the backlight is divided into a plurality of regions and different lights (brightness and color) are emitted from respective regions, may also be employed.

[Applications]

The liquid crystal display device of the present invention includes a direct image viewing type, an image projection type and a light modulation type. The direct image viewing type is suitable for OA equipment such as notebook computer and monitor for personal computers, a multimedia display such as television, and a small-size display device such as car navigation system, cellular phone, portable terminal, watch-like terminal and wearable display. This type of liquid crystal display device is also effective for a display device of amusement machines or a vertically-placed or floor-type large-size conference display device.

The image projection type includes a front projector type of directly projecting an image on a screen, and a rear projector type of projecting an image from the back side of a screen. This type of liquid crystal display device is also effective for a portable projector using an LED light source or the like.

The light modulation type is effective for a three-dimensional display device or a display device called high realistic representation-type display. For example, this type of liquid crystal display device is effective for a three-dimensional display using two liquid crystal cells, or a cylindrical three-dimensional display composed of a plurality of rear projectors.

EXAMPLES

The present invention is described in greater detail below by referring to Examples. The materials, reagents, amounts and ratio of materials, operations and the like indicated in the following Examples may be appropriately modified without departing from the spirit of the present invention. The scope of the present invention is, therefore, not limited to these specific Examples.

(Production of Cellulose Acylate Films 01 to 03)

The composition shown below is charged into a mixing tank and stirred under heating to dissolve respective components, whereby Cellulose Acylate Solution 01 is prepared.

| | |
|---|---|
| Cellulose acetate having a substitution degree of 2.86 | 100 parts by mass |
| Triphenyl phosphate (plasticizer) | 7.8 parts by mass |
| Biphenyldiphenyl phosphate (plasticizer) | 3.9 parts by mass |
| Compound of Chem. (2) below | 0.8 parts by mass |
| Compound of Chem. (3) below | 0.2 parts by mass |
| Methylene chloride (first solvent) | |
| Methanol (second solvent) | |

Chem. (2):

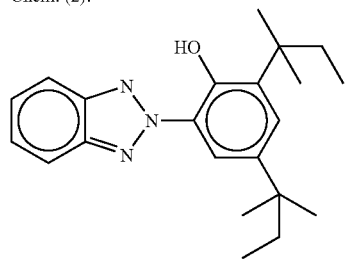

Chem. (3):

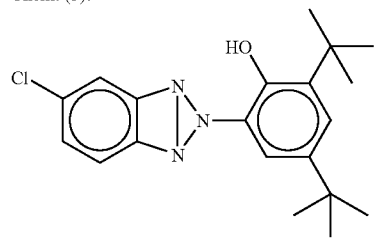

Cellulose Acylate Solution 01 prepared is then cast using a band casting machine composed of a casting part, a tenter part and a drying part. Cellulose Acylate Solution 01 is cast on a continuous metal support in the casting part while adjusting the flow rate to give a film thickness of 70 μm after the production and separated from the metal support in the state of the residual solvent amount being about 55%. After the separation, the web separated is conveyed by a clip-system tenter while holding both edges of the web and dried at 100 to 140° C. When the residual solvent amount becomes about 20%, the web is removed from the tenter. After slitting both edges having clip marks, the web is further dried in the drying part comprising a plurality of rolls to a residual solvent amount of 0.1% and then taken up. In this way, Cellulose Acetate Film 01 is produced.

Cellulose Acylate Films 02 and 03 are produced in the same manner as in Example 1 except that the film thickness is changed to 60 μm and 40 μm.

(Production of Cellulose Acylate Films 04 to 06)

The composition shown below is charged into a mixing tank and stirred to dissolve respective components, whereby Cellulose Acylate Solution 02 is prepared.

| | |
|---|---|
| Cellulose acetate having a substitution degree of 2.86 | 100 parts by mass |
| Triphenyl phosphate (plasticizer) | 7.8 parts by mass |
| Biphenyldiphenyl phosphate (plasticizer) | 3.9 parts by mass |
| Compound of Chem. (2) | 0.8 parts by mass |
| Compound of Chem. (3) | 0.2 parts by mass |
| Methylene chloride | 494.8 parts by mass |
| Methanol | 93.3 parts by mass |
| Butanol | 3.6 parts by mass |

Cellulose Acylate Solution 02 is concentrated to a concentration of 23.5% and then cast using a drum casting machine cooled to −10° C., to give a film thickness of 70 μm after casting. In this way, Cellulose Acetate Film 04 is produced.

Cellulose Acylate Films 05 and 06 are produced in the same manner as in Example 1 except that the film thickness is changed to 60 μm and 40 μm.

(Production of Cellulose Acylate Film 07)

The composition shown below is charged into a mixing tank and stirred to dissolve respective components, whereby Cellulose Acylate Solution A is prepared.

[Composition of Cellulose Acylate Solution B]

| | |
|---|---|
| Cellulose acylate having an acetylation degree of 2.94 | 100.0 parts by mass |
| Methylene chloride (first solvent) | 402.0 parts by mass |
| Methanol (second solvent) | 60.0 parts by mass |

(Preparation of Matting Agent Solution)

20 Parts by mass of silica particle having an average particle diameter of 16 nm (AEROSIL R972, produced by Nihon Aerosil Co., Ltd.) and 80 parts by mass of methanol are thoroughly mixed with stirring for 30 minutes to obtain a silica particle liquid dispersion. This liquid dispersion is charged together with the following composition into a disperser and further stirred for 30 minutes or more to dissolve respective components, whereby Matting Agent Solution A is prepared.

[Composition of Matting Agent Solution]

| | |
|---|---|
| Silica particle liquid dispersion having an average particle diameter of 16 nm | 10.0 parts by mass |
| Methylene chloride (first solvent) | 76.3 parts by mass |
| Methanol (second solvent) | 3.4 parts by mass |
| Cellulose Acylate Solution B | 10.3 parts by mass |

(Preparation of Additive Solution)

The following composition is charged into a mixing tank and stirred under heating to dissolve respective components, whereby a cellulose acetate solution is prepared. As for the compound capable of decreasing the optical anisotropy and the wavelength-dispersion adjusting agent, the compounds shown below are used.

(Composition of Additive Solution)

| | |
|---|---|
| Retardation-decreasing compound shown below (Chem. (4)) | 49.3 parts by mass |
| Wavelength-dispersion adjusting agent shown below (Chem. (5)) | 7.6 parts by mass |
| Methylene chloride (first solvent) | 58.4 parts by mass |
| Methanol (second solvent) | 8.7 parts by mass |
| Cellulose Acylate Solution B | 12.8 parts by mass |

Chem. (4):
Retardation-Decreasing Compound:

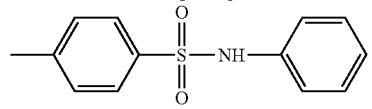

Chem. (5):
Wavelength-Dispersion Adjusting Agent:

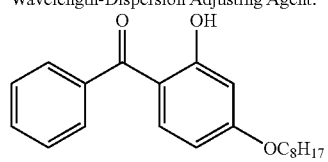

94.6 Parts by mass of Cellulose Acylate Solution B, 1.3 parts by mass of the matting agent solution and 3.8 parts by mass of the additive solution are mixed after filtering each solution and cast using a band casting machine. In the composition above, the mass ratio of the retardation-decreasing compound to the cellulose acylate and the mass ratio of the wavelength-dispersion adjusting agent to the cellulose acylate are 11.1% and 1.1%, respectively. The film thickness is set to 70 μm.

(Production of Cellulose Acylate Film 08)

Cellulose Acylate Film 08 is produced in the same manner as in Example 3 except that the mass ratio of the retardation-decreasing compound to the cellulose acylate and the mass ratio of the wavelength-dispersion adjusting agent to the cellulose acylate are changed to 11.7% and 1.2%, respectively, by adjusting the amount of the additive solution and the film thickness is set to 65 μm.

(Production of Cellulose Acylate Films 09 and 10)

The composition shown below is charged into a mixing tank and stirred under heating to dissolve respective components, whereby Cellulose Acylate Solution C is prepared.

| | |
|---|---|
| Cellulose acylate having an acetylation degree of 2.94 | 100.0 parts by mass |
| Compound of Chem. (3) | 8.8 parts by mass |
| Retardation-decreasing compound of Chem. (4) | 0.8 parts by mass |
| Methylene chloride (first solvent) | 530.0 parts by mass |
| Methanol (second solvent) | 80.0 parts by mass |

Cellulose Acylate Solution C prepared is cast using a band casting machine to give a film thickness of 60 μm or 40 μm, whereby Cellulose Acylate Films 09 and 10 are produced.

[Production of Cellulose Acetate Film 11]

The composition shown below is charged into a mixing tank and stirred under hating to dissolve respective components, whereby Cellulose Acylate Solution D is prepared.

| | |
|---|---|
| Cellulose acylate having an acetylation degree of 2.86 | 100.0 parts by mass |
| Compound of Chem. (3) | 8.8 parts by mass |
| Methylene chloride (first solvent) | 512.0 parts by mass |
| Methanol (second solvent) | 77.0 parts by mass |

Cellulose Acylate Solution C prepared is cast using a band casting machine to give a film thickness of 80 μm, whereby Cellulose Acylate Film 11 is produced.

With respect to Cellulose Acetate Films 01 to 11 obtained, the optical performance is determined using an ellipsometer (M-150, manufactured by JASCO Corp.). The results obtained are shown together in Table 1.

TABLE 1

| | Thickness | Re(550) | Rth(550) | |Re(630) − Re(450)| | |Rth(630) − Rth(450)| |
|---|---|---|---|---|---|
| Cellulose Acetate Film 01 | 70 | 1.1 | 42 | 1.1 | 11 |
| Cellulose Acetate Film 02 | 60 | 0.7 | 35 | 0.9 | 9 |
| Cellulose Acetate Film 03 | 40 | 0.4 | 25 | 0.8 | 7 |
| Cellulose Acetate Film 04 | 70 | 2.5 | 39 | 1.2 | 14 |
| Cellulose Acetate Film 05 | 60 | 2.2 | 34 | 0.8 | 9 |
| Cellulose Acetate Film 06 | 40 | 1.9 | 23 | 0.7 | 6 |
| Cellulose Acetate Film 07 | 70 | 0.3 | −5 | 1 | 10 |
| Cellulose Acetate Film 08 | 65 | 0.2 | 0 | 0.5 | 8 |
| Cellulose Acetate Film 09 | 60 | 0.4 | 9 | 0.3 | 11 |
| Cellulose Acetate Film 10 | 40 | 0.5 | 6 | 0.2 | 8 |
| Cellulose Acetate Film 11 | 80 | 0.3 | 22 | 0.7 | 15 |

(Production of Polarizing Plate)

Cellulose Acetate Films 01 to 11 obtained above each is dipped in an aqueous 1.5 mol/L sodium hydroxide solution at 55° C. for 2 minutes, then washed in a water-washing bath at room temperature, further neutralized using 0.05 mol/L sulfuric acid at 30° C., again washed in a water-washing bath at room temperature and dried with hot air at 100° C. In this way, both surfaces of each film are saponified.

Three kinds of commercially available cellulose acetate films (TD80UL, TFY80UL and ZRF80S, all produced by Fujifilm Corp., thickness: 80 μm) are also saponified in the same manner.

A roll-form polyvinyl alcohol film of 80 μm in thickness is continuously 5-fold stretched in an aqueous iodine solution and dried to obtain a polarizer. The saponified cellulose acetate film is laminated with the polarizer according to the combination shown in Table below by using an aqueous 3% polyvinyl alcohol (PVA-117H, produced by Kuraray Co., Ltd.) as the adhesive to produce a polarizing plate.

Example 1

(Production of Liquid Crystal Display Device)

The polarizing plate provided in a commercially available liquid crystal display device (26C1000, 26-inch size, manufactured by Toshiba Corp.) using an IPS-mode liquid crystal cell is separated, and the liquid crystal cell is taken out. The polarizing plate produced above is laminated to the viewing side (upper side) and the backlight side (lower side) of the liquid crystal cell according to the combination shown below by using an acrylic self-adhesive material. At this time, the lamination is performed by arranging the absorption axis direction of the polarizer to agree with the absorption axis of the originally provided polarizing plate. The thus-produced liquid crystal panel is placed back to produce a liquid crystal display device.

TABLE 2

| | Protective Film | |
|---|---|---|
| Polarizing Plate 1 | Cellulose Acylate Film 01 | Cellulose Acylate Film 01 |
| Polarizing Plate 2 | Cellulose Acylate Film 02 | Cellulose Acylate Film 02 |
| Polarizing Plate 3 | Cellulose Acylate Film 03 | Cellulose Acylate Film 03 |
| Polarizing Plate 4 | Cellulose Acylate Film 04 | Cellulose Acylate Film 04 |
| Polarizing Plate 5 | Cellulose Acylate Film 05 | Cellulose Acylate Film 05 |
| Polarizing Plate 6 | Cellulose Acylate Film 06 | Cellulose Acylate Film 06 |
| Polarizing Plate 7 | cellulose acetate film (TD80UL) | cellulose acetate film (TD80UL) |
| Polarizing Plate 8 | cellulose acetate film (TFY80UL) | cellulose acetate film (TFY80UL) |
| Polarizing Plate 9 | Cellulose Acylate Film 07 | Cellulose Acylate Film 01 |
| Polarizing Plate 10 | Cellulose Acylate Film 08 | Cellulose Acylate Film 02 |
| Polarizing Plate 11 | Cellulose Acylate Film 09 | Cellulose Acylate Film 02 |
| Polarizing Plate 12 | Cellulose Acylate Film 10 | Cellulose Acylate Film 03 |
| Polarizing Plate 13 | Cellulose Acylate Film 11 | commercially available cellulose acetate film |
| Polarizing Plate 14 | cellulose acetate film (ZRF80S) | cellulose acetate film (TFY80UL) |

TABLE 3

| | Polarizing Plate on Viewing Side | | | Polarizing Plate on Backlight Side | | |
|---|---|---|---|---|---|---|
| | Kind of Polarizing Plate (film of retardation layer (A) in parenthesis) | ReU | RthU | Kind of Polarizing Plate (film of retardation layer (B) in parenthesis) | ReD | RthD |
| Liquid Crystal Display Device 1 | Polarizing Plate 1 (Cellulose Acylate Film 01) | 1.1 | 42 | Polarizing Plate 9 (Cellulose Acylate Film 07) | 0.3 | −5 |
| Liquid Crystal Display Device 2 | Polarizing Plate 2 (Cellulose Acylate Film 02) | 0.7 | 35 | Polarizing Plate 10 (Cellulose Acylate Film 08) | 0.2 | 0 |
| Liquid Crystal Display Device 3 | Polarizing Plate 2 (Cellulose Acylate Film 02) | 0.7 | 35 | Polarizing Plate 11 (Cellulose Acylate Film 09) | 0.4 | 9 |
| Liquid Crystal Display Device 4 | Polarizing Plate 3 (Cellulose Acylate Film 03) | 0.4 | 25 | Polarizing Plate 12 (Cellulose Acylate Film 10) | 0.5 | 6 |
| Liquid Crystal Display Device 5 | Polarizing Plate 4 (Cellulose Acylate Film 04) | 2.5 | 39 | Polarizing Plate 9 (Cellulose Acylate Film 07) | 0.3 | −5 |
| Liquid Crystal Display Device 6 | Polarizing Plate 5 (Cellulose Acylate Film 05) | 2.2 | 34 | Polarizing Plate 10 (Cellulose Acylate Film 08) | 0.2 | 0 |
| Liquid Crystal Display Device 7 | Polarizing Plate 5 (Cellulose Acylate Film 05) | 2.2 | 34 | Polarizing Plate 11 (Cellulose Acylate Film 09) | 0.4 | 9 |
| Liquid Crystal Display Device 8 | Polarizing Plate 6 (Cellulose Acylate Film 06) | 1.9 | 23 | Polarizing Plate 12 (Cellulose Acylate Film 10) | 0.5 | 6 |
| Liquid Crystal Display Device 9 | Polarizing Plate 1 (Cellulose Acylate Film 01) | 1.1 | 42 | Polarizing Plate 12 (cellulose acetate film 10) | 0.5 | 6 |

With respect to the produced liquid display devices, the black brightness, the color tint at an azimuthal angle of 45° and a polar angle of 60°, and the change in color tint when measured in all directions of the azimuthal angle at a polar angle of 60° are determined using EZ-Contrast 160D. As a result, in all liquid crystal panels, good display quality is exhibited with small light leakage and small change in color tint and with a color tint close to neutral gray. Also, when the liquid crystal display is left standing under temperature and humidity conditions of 60° C. and 90% R.H. for 48 hours and then lighted by taking it out into an environment of 25° C. and 60% R.H., in Liquid Crystal Display Devices 1 to 8, only slight light leakage is observed in the periphery of the display part, but in Liquid Crystal Display Device 9, light leakage is observed in the periphery of the display part.

Example 2

(Production of Liquid Crystal Display Device)

A liquid crystal layer is injected between two glass substrates to produce an IPS-mode liquid crystal cell in which the distance between substrates (gap: d) is 3.4 μm. At this time, Δn of the liquid crystal layer is 0.08765 and the d●Δn value of the liquid crystal layer is 298 nm. Incidentally, two glass substrates are disposed to cause their rubbing directions to run in parallel.

Polarizing Plate 2 as the upper polarizing plate and Polarizing Plate 10 as the lower polarizing plate are laminated in the same manner as in Example 1 to produce Liquid Crystal Display Device 10. The display performance of the obtained liquid crystal display device is evaluated, as a result, the same display quality as that in Example 1 is exhibited.

Comparative Example 1

Production of Liquid Crystal Display Device

Using the liquid crystal cell of Example 1, polarizing plates are laminated thereto according to the combination shown below in the same manner as in Example 1. The liquid crystal panel is placed back to produce a liquid crystal display device.

TABLE 4

| | Polarizing Plate on Viewing Side | | | Polarizing Plate on Backlight Side | | |
|---|---|---|---|---|---|---|
| | Kind of Polarizing Plate (film of retardation layer (A) in parenthesis) | ReU | RthU | Kind of Polarizing Plate (film of retardation layer (B) in parenthesis) | ReD | RthD |
| Liquid Crystal Display Device 11 | Polarizing Plate 7 (TD80UL) | 2.8 | 44 | Polarizing Plate 13 (Cellulose Acetate Film 11) | 0.3 | 22 |
| Liquid Crystal Display Device 12 | Polarizing Plate 8 (TFY80UL) | 1.2 | 47 | Polarizing Plate 14 (ZRF80S) | 0.2 | −8 |

The display quality of the produced liquid crystal display devices is examined in the same manner as in Example 1, as a result, coloration to yellow and large change in color tint are observed in Liquid Crystal Display Device 11. In Liquid Crystal Display Device 12, the transmittance of black brightness is high and the light leakage is large. Also, in both of Liquid Crystal Display Devices 11 and 12, it is confirmed that light leakage appears in the periphery of the panel which is subjected to the same humidity/heat treatment as in Example 1.

According to the present invention, a liquid crystal display device having excellent contrast viewing angle properties can be provided. Also, according to the present invention, a liquid crystal display device where color shift is unobserved or alleviated even when obliquely viewed at the black display time can be provided. Furthermore, according to the present invention, a liquid crystal display device undergoing less change in the display performance due to change in the temperature and humidity and having excellent durability can be provided.

The entire disclosure of each and every foreign patent application from which the benefit of foreign priority has been claimed in the present application is incorporated herein by reference, as if fully set forth.

What is claimed is:

1. A liquid crystal display device comprising:
   a pair of polarizing films;
   a liquid crystal cell that is sandwiched between the pair of polarizing films;
   a retardation layer (A) of 70 μm or less in thickness, which is disposed between the liquid crystal cell and one of the pair of polarizing films; and
   a retardation layer (B) of 70 μm or less in thickness, which is disposed between the liquid crystal and the other of the pair of polarizing films,
   wherein
   the liquid crystal cell comprises:
      a pair of oppositely disposed substrates, at least one of which has at least a pair of electrodes; and
      an orientation-controlled liquid crystal layer that is disposed between the pair of oppositely disposed substrates,
   the electrodes creates an electric field having a component parallel to the substrate having the electrodes, and
   the retardation layers (A) and (B) satisfy the following formulae (1) to (3):

$$RthU > RthD \qquad \text{Formula (1):}$$

$$-20 \text{ nm} \leq RthD \leq 20 \text{ nm} \qquad \text{Formula (2):}$$

$$20 \text{ nm} < RthU \leq 60 \text{ nm} \qquad \text{Formula (3):}$$

wherein

RthU represents a retardation in a thickness direction at a wavelength of 550 nm of the retardation layer (A), and RthD represents a retardation in a thickness direction at a wavelength of 550 nm of the retardation layer (B).

2. The liquid crystal display device according to claim 1, wherein the retardation layers (A) and (B) satisfy following formulae (4) and (5):

$$-10 \text{ nm} \leq ReU \leq 10 \text{ nm} \qquad \text{Formula (4):}$$

$$-10 \text{ nm} \leq ReD \leq 10 \text{ nm} \qquad \text{Formula (5):}$$

wherein

ReU represents an in-plane retardation at a wavelength of 550 nm of the retardation layer (A), and ReD represents an in-plane retardation at a wavelength of 550 nm of the retardation layer (B).

3. The liquid crystal display device according to claim 1, wherein the retardation layers (A) and (B) both comprise a cellulose acylate film.

4. The liquid crystal display device according to claim 3, further comprising:

two pairs of protective films, wherein each polarizing film of the pair of polarizing films is sandwiched between each pair of the two pairs of protective films, and the thinnest protective film and the thickest protective film are different in film thickness by 20 μm or less.

5. The liquid crystal display device according to claim 1, wherein the electric field having a component parallel to the substrate having an electrode is generated by a pixel electrode and a counter electrode which are disposed in different layers.

6. The liquid crystal display device according to claim 1, wherein the electric field having a component parallel to the substrate having an electrode is generated by a pair of electrodes, which are disposed in different layers and at least one of which is transparent, and by an electrode to which a voltage is not applied.

7. The liquid crystal display device according to claim 1, wherein the retardation layer (A) satisfies following formulae (6)-3 and (7)-4:

| | |
|---|---|
| $\|Re(450)-Re(630)\| \leqq 10$ nm | Formula (6)-3: |
| $\|Rth(450)-Rth(630)\| 35$ nm. | Formula (7)-4: |

* * * * *